(12) United States Patent
Badt, Jr.

(10) Patent No.: US 7,778,627 B2
(45) Date of Patent: Aug. 17, 2010

(54) SYSTEM, METHOD, AND COMPUTER READABLE MEDIUM FOR PROVIDING SECURE ACCESS BETWEEN DEVICES

(75) Inventor: Sig Harold Badt, Jr., Richardson, TX (US)

(73) Assignee: Alcatel Lucent, Paris (FR)

( * ) Notice: Subject to any disclaimer, the term of this patent is extended or adjusted under 35 U.S.C. 154(b) by 699 days.

(21) Appl. No.: 11/198,115

(22) Filed: Aug. 4, 2005

(65) Prior Publication Data

US 2007/0032221 A1 Feb. 8, 2007

(51) Int. Cl.
*H04M 3/42* (2006.01)
(52) U.S. Cl. ............ 455/414.1; 455/415; 455/410; 455/411; 455/412.1
(58) Field of Classification Search ........ 455/414.1, 455/415, 422.1, 410, 411, 412.1; 379/67.1, 379/167.06, 211.02, 220.01
See application file for complete search history.

(56) References Cited

U.S. PATENT DOCUMENTS

| | | | | |
|---|---|---|---|---|
| 5,425,089 A | | 6/1995 | Chan et al. | |
| 6,072,868 A | * | 6/2000 | Irvin | 379/355.09 |
| 6,078,654 A | * | 6/2000 | Mashinsky | 379/207.13 |
| 6,496,579 B1 | * | 12/2002 | Mashinsky | 379/220.01 |
| 6,694,003 B1 | * | 2/2004 | Karam | 379/211.02 |
| 7,280,646 B2 | * | 10/2007 | Urban et al. | 455/415 |
| 7,283,625 B2 | * | 10/2007 | Urban et al. | 455/415 |
| 2003/0152198 A1 | * | 8/2003 | Price | 379/67.1 |
| 2003/0216960 A1 | * | 11/2003 | Postrel | 705/14 |
| 2004/0219903 A1 | * | 11/2004 | Despain et al. | 455/410 |
| 2005/0233733 A1 | * | 10/2005 | Roundtree et al. | 455/414.1 |

* cited by examiner

*Primary Examiner*—Joseph H Feild
*Assistant Examiner*—Huy D Nguyen
(74) *Attorney, Agent, or Firm*—RG & Associates LLC

(57) ABSTRACT

A system, method, and computer readable medium for providing secure access between devices comprises generating a new and unique access code by a cell phone, providing the new and unique access code by the cell phone to at least one of: a user of a further device, and the further device, contacting the cell phone by the further device, sending the new and unique access code by the further device to the cell phone, and permitting a connection between the further device and the cell phone, by the cell phone.

25 Claims, 2 Drawing Sheets

SYSTEM, METHOD, AND COMPUTER READABLE MEDIUM FOR PROVIDING SECURE ACCESS BETWEEN DEVICES

FIELD OF THE INVENTION

The present invention relates generally to security, and, more particularly, to a system, method, and computer readable medium for providing secure access between devices.

BACKGROUND OF THE INVENTION

For a number of years, there have been schemes for blocking undesired incoming telephone calls based on access codes. An access code is a number that performs a function similar to the combination to a lock. With these existing schemes, when a caller calls a destination phone, the destination phone answers the call and asks the caller to enter an access code. The caller enters the access code from the caller's keypad. Undesired callers are blocked because those callers know the destination phone's phone number, which is widely distributed, but do not know the access code, which is secret.

A problem with such schemes is that for each phone, there is only one access code. Eventually this access code also becomes widely distributed and falls into the hands of undesired callers. Because there is only one access code, it is not possible to block incoming calls from one undesired caller without also blocking calls from all callers. A solution to this problem is well known. It is to use multiple access codes for each phone. Whenever the owner of a telephone is asked for his or her phone number, he or she gives out his phone number along with a unique access code. If one access code falls into the hands of an undesired caller, the owner of the telephone disables only that one access code.

There are a number of problems associated with multiple access codes. One problem relates to the face that an owner of the telephone must be able to produce a unique access code whenever and wherever he or she is asked for his or her telephone number. Another problem is that after creating a new access code, the owner must manually keep track of the access code. At a minimum, the owner must manually keep track of the access code for as long as it takes to enter the access code into an automated database. Since the owner of a telephone is frequently not near a computer terminal, this is difficult.

As such, what is needed is a solution that overcomes these problems and limitations by providing a mechanism for blocking undesired phone calls, e-mail messages, or presence subscription requests.

SUMMARY OF THE INVENTION

The present invention discloses a system, method, and computer readable medium for providing secure access between devices. In such a scenario, an owner may use his or her cellular telephone to generate new access codes and utilize such access codes as a blocking mechanism (in effect, as an anti-spam technique).

In one embodiment, a method for managing communication access of a contacting party to a subscriber which is reachable via a routing identifier in a communication system comprises generating a unique access code by a communication device associated with the subscriber, supplying the unique access code to the contacting party, initiating a communication request by the contacting party to the communication device associated with the subscriber, and granting communication access to the communication device associated with the subscriber only for those requests from the contacting party which include both the routing identifier and the unique access code.

In another embodiment, a method for providing secure access between devices comprises generating a new and unique access code by a cell phone, providing the new and unique access code by the cell phone to at least one of: a user of a further device, and the further device, contacting the cell phone by the further device, sending the new and unique access code by the further device to the cell phone, and permitting a connection between the further device and the cell phone, by the cell phone.

In a further embodiment, a method for providing secure access between devices comprises: generating a new and unique access code by a first device, providing the new and unique access code by the first device to a second device, contacting the first device by the second device, prompting a user of the second device to enter the new and unique access code, receiving the new and unique access code entered by the second device, and connecting the second device and the first device.

In yet another embodiment, a computer readable medium comprises instructions for: requesting a connection to a cell phone device by another device, nearly contemporaneously generating a new and unique access code by the cell phone, providing the new and unique access code by the cell phone to the other device, and connecting the cell phone with the second device when the other device utilizes the new and unique access code.

In yet a further embodiment, a system for providing secure access between devices comprises: a first device, and a second device, wherein the first device generates a new and unique access code in response to a communication request by the second device, wherein the new and unique access code is provided by the first device to the second device, wherein the second device utilizes the new and unique access code to contact the first device, and wherein other devices associated with a user of the second device can utilize the new and unique access code to contact the first device.

In yet another embodiment, an electronic device for providing secure access, comprising: a first module adapted to generate a new and unique access code in response to a communication request by another device, a second module adapted to store the new and unique access code, the first module and the second module adapted to verify the new and unique access code when it is received from the other device, and based on a successful verification, the first module adapted to provide a connection from the other device to the electronic device.

DETAILED DESCRIPTION OF THE INVENTION

Figure 1:
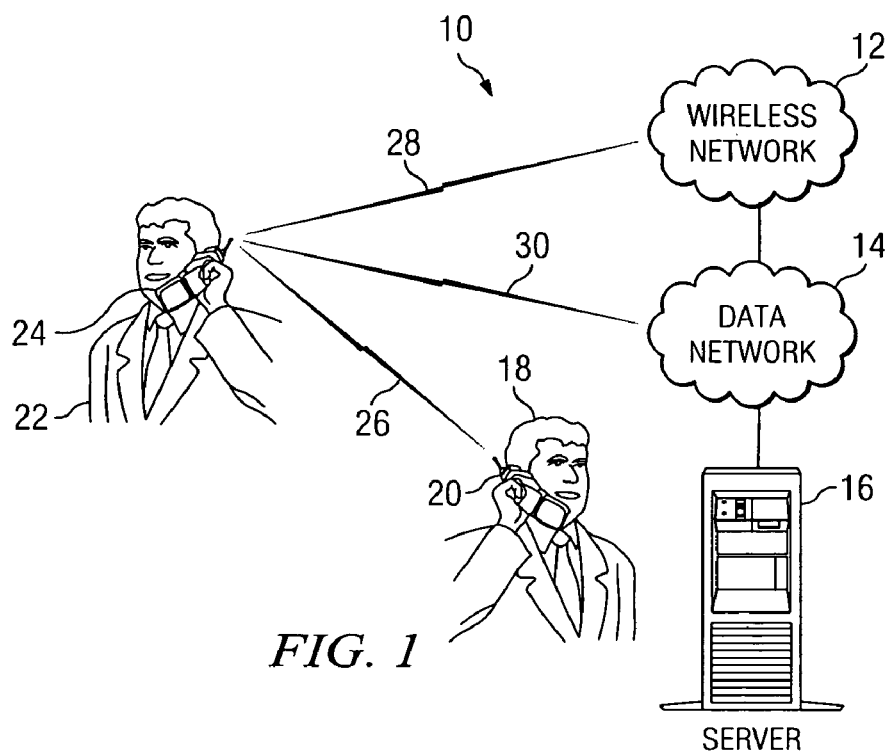
FIG. 1 depicts a system in accordance with a preferred embodiment of the present invention.

The present invention describes a system, method, and computer readable medium for providing secure access between devices that can be used for, among other purposes, blocking various callers and/or messages from reaching a particular individual or that individuals device (such as a cell phone, computer, etc.). Such a solution is applicable across different media, and can also be used to grant presence access. Presence is generally defined as knowing that a person is available via, for example, a certain device over a particular medium. For instance, via presence information, it may be ascertained that the person is available online, and on a connected device with a certain device profile. Knowing that the person is online identifies that there is a way to communicate with that person. Presence information describes how the person can be communicated with (for example, via SMS messages, e-mail, voice call, etc.).

There are many techniques for blocking various forms of spam. For e-mail, most schemes involve blocking e-mail messages based on the source address or the message content. Most techniques for blocking unwanted phone calls are based on the source address of the call. Techniques for blocking unwanted presence subscription requests are based on active or passive authorization. In some cases, even legal action is used as a technique for blocking spam. Such techniques are limited, however, because it is often difficult to distinguish between spam and legitimate e-mail, phone calls, and presence subscription requests.

With the present invention, any time a person is asked to give out his or her phone number, e-mail address, or presence URI, that person uses his or her cellular telephone to generate a unique numeric access code. The present invention further blocks incoming calls, e-mail messages, or presence subscription requests that do not have valid access codes. If an access code falls into the hand of a person who is sending unwanted e-mail messages, phone calls, or presence subscription requests, that one access code can be blocked. As such, multiple access codes exist and it is possible to block one access code without blocking all access codes, thereby providing an improved form of caller ID.

Today, many people carry cellular telephones with them at all times. These people are likely to have access to their cellular telephones whenever they are asked for their phone number. The present invention provides an ability for a user to provide an input (such as, for example, by pressing a button or sequence of buttons on the cellular telephone) to cause the cellular telephone to generate a new and unique access code. The new access code is displayed on the phone's display and/or audibly presented thereby simplifying the ability for a user to provide a different access code every time the user is asked for his or her phone number. It is important to note that these access codes or other access codes can be used to restrict access to other types of information such as a user's email address, instant message address, avatar, or any other access mechanism.

When a caller calls the cellular phone of the person who provided the access code (or even other phones owned by the same person) the caller is prompted to enter an access code. If one access code falls into the hands of an undesired caller, the person who gave out that access code can disable that one access code (and can provide the caller with a new access code or temporary access code, manually, automatically or after a certain amount of time). Only the callers with that access code are blocked.

A similar scheme can be used for e-mail messages. Whenever a user is asked for his or her e-mail address, the user is provided with a unique access code from the user's cellular telephone. A sender of e-mail who wants to send an e-mail message to the user must incorporate the access code into the e-mail. There are a number of mechanisms by which an access code can be incorporated into an e-mail message. For example, an access code can be included in a destination address, meta data, subject line, body, or an attachment.

Another similar scheme can be used for presence subscriptions. For example, state information about people, called presentities, can be distributed to other people called watchers. In order for a watcher to subscribe to a presentity, the watcher should have the presentity's URI. When a person is asked to give out his or her presence URI, the person can use his or her cellular telephone to generate a unique access code. When a watcher subscribes to the presence of a presentity, an access code is incorporated in the subscription request.

Entering an access code every time a person makes a phone call, sends an e-mail message, or subscribes to a presentity can be burdensome. Automated systems can make this task easier. In one scenario of the present invention, a person is given a telephone number and an access code. That person uses his or her telephone, cellular telephone, or computer to manually enter both the access code and telephone number into a database. After such an activity, whenever the user dials the phone number, the access code is entered automatically. In another scenario, a person is given a telephone number and an access code. At some time in the future, that person dials that telephone number and manually enters the access code. The system remembers the phone number and access code. The next time the user dials the same phone number, the system automatically enters the access code.

A similar mechanism can eliminate the need for a user to manually enter an access code every time the user sends an e-mail message or sends a presence subscribe request message. It is also a further embodiment of the present invention to build a caller ID related system based on access codes. For example, when a user is asked for his or her phone number, the user uses his or her cellular telephone to generate a new access code. At the same time, the user also enters a text message into his or her cellular telephone describing the person or institution to whom the phone number and access code are given. When the user's telephone receives a phone call together with a valid access code, the telephone recalls the associated text message and displays it. This scheme has an advantage over conventional caller ID systems in that it identifies the caller, in addition to or apart from the caller's telephone. A variation on the scheme described above allows the user to enter a voice message instead of a text message. The voice message can serve as an audio caller ID.

The present invention can be implemented in the cell phone itself, in the network, or in a combination of both. It can be implemented both with a circuit switched and an IP network. In such a scenario, there are ways to block spam at the edge of the network which can reduce the network load.

Referring now to FIG. 1, a system 10 of the present invention includes a wireless network 12 (which may be a cellular network, a wireless local area network, or any other type of wireless network) operably coupled to a data network 14 (which may be the Internet, a private data network, or any other type of data network). The data network 14 is operably coupled to a server 16 which may be independent of, or contained in either of, the wireless network 12 or the data network 14. In other embodiments of the present invention, the wireless network 12 and the data network 14 may be a single network that may or may not include the server 16.

The wireless network 12 and the data network 14 may be accessed by a number of devices. For example, the wireless network 12 may be accessed by a cellular phone 24 (which may be an Internet Protocol enabled phone) or a computer (not shown) with external wireless capability (such as a wireless card) or internal wireless capability (such as 802.11 or any of the other 802 variants), while the data network 14 may be accessed by the cellular phone 24 or the computer via a physical or a wireless connection to the data network 14. The cellular phone 24 may communicate with the wireless network 12 and the data network 14 via a communication interface or link 28 and/or 30.

Figure 2:
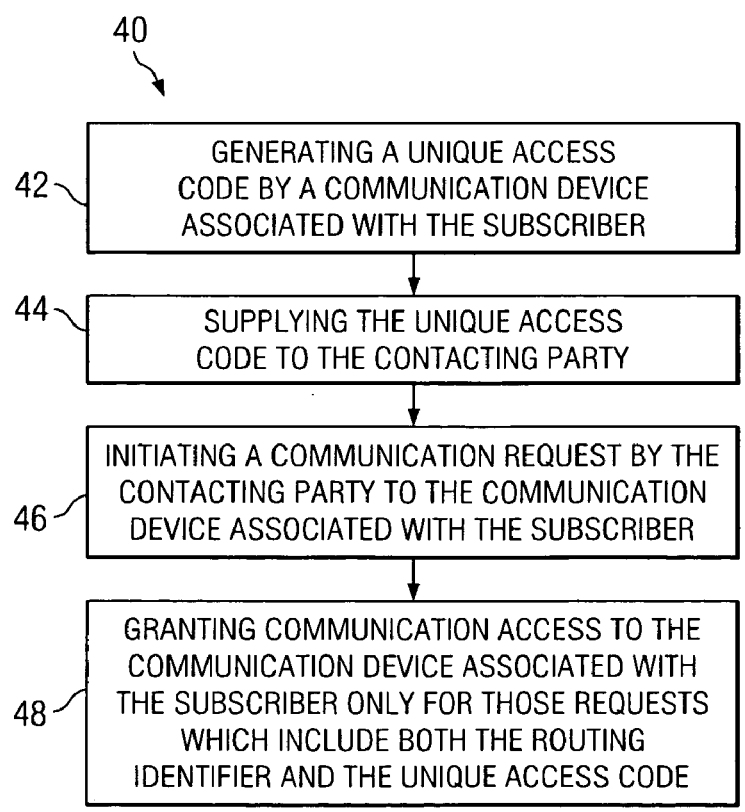
FIG. 2 depicts a flow chart for a method for managing communication access of a contacting party to a subscriber which is reachable via a routing identifier in a communication system in accordance with a preferred embodiment of the present invention.

Referring now to FIG. 2, a method 40 for managing communication access of a contacting party to a subscriber 22 which is reachable via a routing identifier in a communication system comprises generating 42 a unique access code by a communication device 24 associated with the subscriber, supplying 44 the unique access code to the contacting party 18 (via the communication interface 26), initiating 46 a communication request by the contacting party (via a communication device 20) to the communication device associated with the subscriber, and granting 48 communication access to the communication device associated with the subscriber only for those requests from the contacting party which include both the routing identifier and the unique access code. In such an embodiment, the communication device is a mobile phone, and the generated unique access code can be automatically forwarded from the communication 24 device to a central memory 16 in the communication system.

Figure 3:
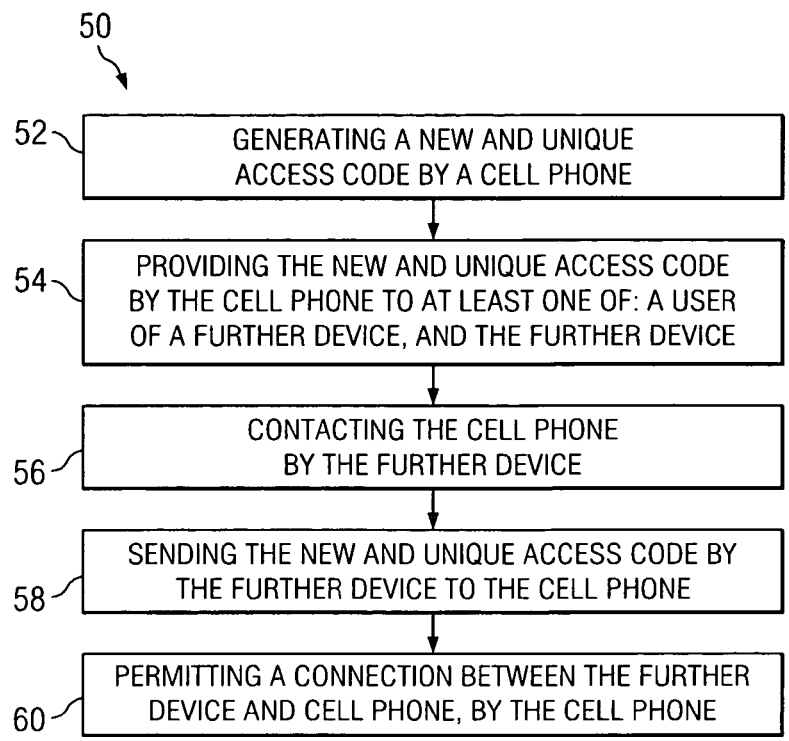
FIG. 3 depicts a flow chart for a method for providing secure access between devices in accordance with a preferred embodiment of the present invention.

Referring now to FIG. 3, a method 50 of the present invention for providing secure access between devices comprises generating 52 a new and unique access code by a cell phone, providing 54 the new and unique access code by the cell phone to at least one of: a user of a further device, and the further device, contacting 56 the cell phone by the further device, sending 58 the new and unique access code by the further device to the cell phone, and permitting 60 a connection between the further device and the cell phone, by the cell phone. The method 50 further comprises generating a plurality of new and unique access codes by the cell phone, providing each of the plurality of new and unique access codes to each of other devices, utilizing the new and unique access code by other devices associated with a user of the further device, utilizing the new and unique access code by some of other devices associated with a user of the further device, generating the access code by at least one of a following: depressing a button on the cell phone, depressing a sequence of buttons on the cell phone, receiving a verbal command by the cell phone, a location of the cell phone, a location of the further phone, and a location of the user.

The method 50 additionally comprises displaying the access code on a display of the cell phone, audibly providing the access code via the cell phone, storing the access code in at least one of: a memory in the cell phone, a memory in the further device, a memory in a network accessible by the cell phone, and a memory in a network accessible by the further device, wherein the access code can be permanently disabled, temporarily disabled, and can be reassigned to another device associated with a user of the cell phone.

Figure 4:
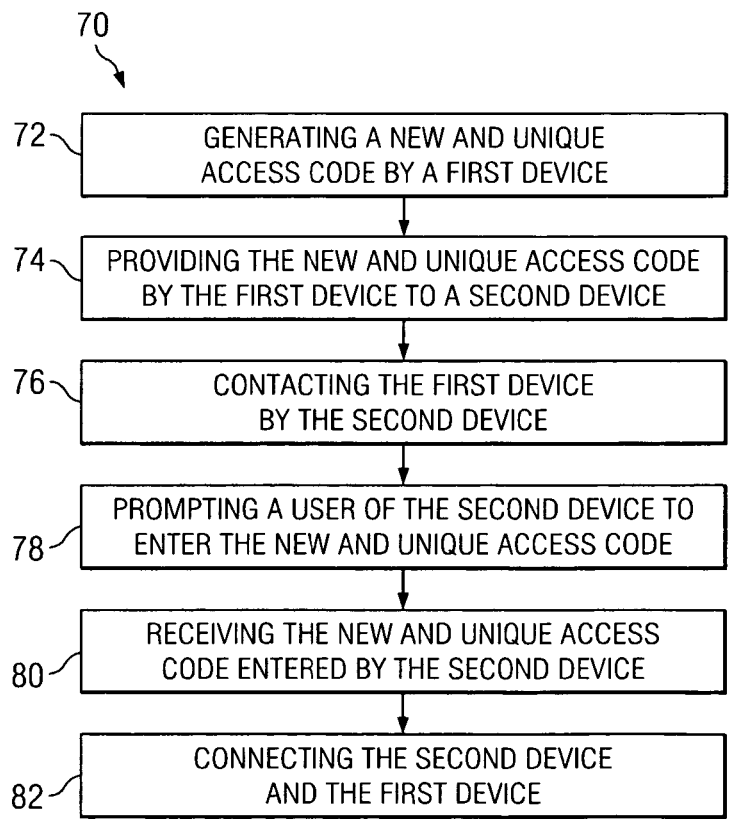
FIG. 4 depicts a flow chart for another method for providing secure access between devices in accordance with a preferred embodiment of the present invention.

Referring now to FIG. 4, a method 70 for providing secure access between devices comprises: generating 72 a new and unique access code by a first device, providing 74 the new and unique access code by the first device to a second device, contacting 76 the first device by the second device, prompting 78 a user of the second device to enter the new and unique access code, receiving 80 the new and unique access code entered by the second device, and connecting 82 the second device and the first device.

The present invention includes a unique computer readable medium or software that is preferably stored on the telephone 24. In other embodiments, the software of the present invention can be stored on the server 16, or a combination of at least the telephone 24 and the server. Such a computer readable medium comprises instructions for performing the functionality described in relation to FIGS. 1-4 and for requesting a connection to a cell phone device by another device, nearly contemporaneously generating a new and unique access code by the cell phone, providing the new and unique access code by the cell phone to the other device, and connecting the cell phone with the second device when the other device utilizes the new and unique access code.

The computer readable medium of the present invention further comprises instructions for equating the new and unique access code with the other device, storing and tracking the new and unique access code, disabling the new and unique access code, blocking a connection to the cell phone by the other device, generating another new and unique access code by the cell phone, providing the other new and unique access code by the cell phone to the other device, utilizing the other new and unique access code to connect the other device to the cell phone.

Referring again to FIG. 1, the system 10 of the present invention for providing secure access between devices comprises a first device (such as cell phone 24) and a second device (such as cell phone 20), wherein the first device generates a new and unique access code in response to a communication request by the second device, wherein the new and unique access code is provided by the first device to the second device, wherein the second device utilizes the new and unique access code to contact the first device, and wherein other devices associated with a user of the second device can utilize the new and unique access code to contact the first device.

With the system 10 of the present invention, communication between the first device and the second device occurs via at least one of: a wireless network 26, a wireless protocol, a wired network (not shown) and a wired protocol. The devices 20 and 24 are at least one of: a mobile phone, a computer, a personal digital assistant, a device capable of providing email functionality, a device capable of providing voice functionality, and a device capable of providing multimedia functionality, wherein at least one of a routing identifier associated with the first device and the new and unique access code associated with the first device are stored, wherein the new and unique access code is automatically sent when the routing identifier is sent, wherein at least one of a routing identifier associated with the second device and a name of a user associated with the second device are stored, wherein the name of the user associated with the second device is displayed on the first device when the new and unique access code is received by the first device and, wherein the name of the user associated with the second device is audibly provided via the first device when the new and unique access code is received by the first device.

In another embodiment of the present invention, an electronic device for providing secure access comprises a first module (not shown) such as a processor, for example, adapted to generate a new and unique access code in response to a communication request by another device, a second module (not shown) such as memory, adapted to store the new and unique access code, the first module and the second module adapted to verify the new and unique access code when it is received from the other device, and based on a successful verification, the first module adapted to provide a connection from the other device to the electronic device.

The present invention utilizes human intervention at various instances.

For example, a person uses his or her cellular telephone to generate an access code when that person is asked for his or her phone number. This action is not an inconvenience as there is a direct benefit for this action. Further, technology can be used to mitigate nearly any time involved in generating and transcribing an access code. A telephone number and its associated access code can be transferred between two cellular telephones or between a cellular telephone and another telephone using a wireless link such as an infrared link or a Bluetooth link.

Additionally, a caller enters an access code when that caller makes a phone call. This user in a sense is coerced into entering this information and this action is simple to undertake (the user either enters the access code or the call is not completed).

Again, through the use of technology, the access code can automatically be sent based on the number being dialed. These solutions also pertain to email and presence related features.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system 10 can be performed by one or more of the modules or components described herein or in a distributed architecture. For example, all or part of the functionality performed by the server 16 or the telephone 24, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless source, a wired source and/or via plurality of protocols. Still further, the telephone 24 may be a cellular phone, a computer or any type of device able to receive and send a message. Also, the messages sent or received by any of the modules may be sent or received directly and/or via one or more of the other modules or nodes (not shown).

Still other embodiments of the present invention exist. For example, the present invention can be used to control access to buildings and other locations with restricted access. In such a scenario, a person may live in an apartment building with a common door. A visitor must enter an access code on a keypad next to the door to gain access to the building. A resident of the building can use her or her cell phone to provide unique access codes to everyone authorized to enter the building. Such a scheme can be used to control access to any shared resources such as cars in a motor pool, storage lockers, projectors, cameras, etc. Further, a person providing an access code can utilize a random number generator to provide such access codes, and can specify how many times the access code can be used in a specific time frame or in totality before expiring. This information can be provided at the time the access code is provided to an individual, can be input by using a keypad on the cellular phone, or can be automatically provided with the access code. The person providing the access code may also limit time periods and locations during which the access code can be used. Still further, and from a security perspective, a two-part access code or key can be provided to a caller whereby one part of the access code is provided by the cellular phone and the second part is provided by another device contemporaneously or at a different time or in response to a certain action taken by the user or the potential or current caller.

What is claimed is:

1. A method for managing communication access of a contacting party to a subscriber which is reachable via a routing identifier in a communication system, comprising:
   generating and storing a new and unique access code by a communication device associated with the subscriber, wherein the new and unique access code is configured to limit locations and times that the new and unique access code can be used;
   supplying the new and unique access code by the communication device to a further device of the contacting party;
   initiating a communication request by the further device, of the contacting party to the communication device associated with the subscriber;
   verifying the new and unique access code; and
   granting communication access to the communication device associated with the subscriber only for those requests from the further device of the contacting party which are verified and which include both the routing identifier and the new and unique access code.

2. The method of claim 1, wherein the communication device is a mobile phone.

3. The method of claim 1, wherein the generated new and unique access code is automatically forwarded from the communication device to a central memory in the communication system.

4. A method for providing secure access between devices, comprising:
   generating and storing a new and unique access code by a cell phone, wherein the new and unique access code is configured to limit locations and times that the new and unique access code can be used;
   providing the new and unique access code by the cell phone to at least one of: a user of a further device and the further device;
   contacting the cell phone by the further device;
   sending the new and unique access code by the further device to the cell phone;
   verifying the new and unique access code; and
   permitting a connection between the further device and the cell phone, by the cell phone based on the verifying.

5. The method of claim 4 comprising generating a plurality of new and unique access codes by the cell phone.

6. The method of claim 5 comprising providing each of the plurality of new and unique access codes to each of other devices.

7. The method of claim 4 comprising utilizing the new and unique access code by other devices associated with a user of the further device.

8. The method of claim 4 comprising utilizing the new and unique access code by some of other devices associated with a user of the further device.

9. The method of claim 4 comprising generating the access code by at least one of a following: depressing a button on the cell phone; depressing a sequence of buttons on the cell phone; receiving a verbal command by the cell phone; a location of the cell phone; a location of the further phone; and a location of the user.

10. The method of claim 4 comprising displaying the access code on a display of the cell phone.

11. The method of claim 4 comprising audibly providing the access code via the cell phone.

12. The method of claim 4 comprising storing the access code in at least one of: a memory in the cell phone; a memory in the further device; a memory in a network accessible by the cell phone; and a memory in a network accessible by the further device.

13. The method of claim 4, wherein the access code can be permanently disabled.

14. The method of claim 4, wherein the access code can be temporarily disabled.

15. The method of claim 4, wherein the access code can be reassigned to another device associated with a user of the cell phone.

16. A method for providing secure access between devices, comprising:
   generating a new and unique access code by a first device and storing the new and unique access code, wherein the new and unique access code is configured to limit locations and times that the new and unique access code can be used;
   providing the new and unique access code by the first device to a second device;
   contacting the first device by the second device;
   prompting a user of the second device to enter the new and unique access code;
   receiving the new and unique access code entered by the second device;
   verifying the new and unique access code; and connecting the second device and the first device.

17. A computer readable medium having computer executable instructions for:
   requesting a connection to a cell phone device by another device;
   nearly contemporaneously generating a new and unique access code by the cell phone and storing the new and unique access code, wherein the new and unique access code is configured to limit locations and times that the new and unique access code can be used;
   providing the new and unique access code by the cell phone to the other device;
   automatically verifying the new and unique access code; and
   connecting the cell phone with the other device when the other device utilizes the new and unique access code.

18. The computer readable medium of claim 17 comprising instructions for equating the new and unique access code with the other device.

19. The computer readable medium of claim 17 comprising instructions for storing and tracking the new and unique access code.

20. The computer readable medium of claim 17 comprising instructions for disabling the new and unique access code.

21. The computer readable medium of claim 20 comprising instructions for blocking a connection to the cell phone by the other device.

22. The computer readable medium of claim 20 comprising instructions for generating another new and unique access code by the cell phone.

23. The computer readable medium of claim 22 comprising instructions for providing the other new and unique access code by the cell phone to the other device.

24. The computer readable medium of claim 23 comprising instructions for utilizing the other new and unique access code to connect the other device to the cell phone.

25. A system for providing secure access between devices, comprising:
   a first device; and a second device;
   wherein the first device generates and stores a new and unique access code, wherein the new and unique access code is configured to limit locations and times that the new and unique access code can be used, in response to a communication request by the second device;
   wherein the new and unique access code is provided by the first device to the second device;
   wherein the second device utilizes the new and unique access code to contact the first device code; and
   wherein other devices associated with a user of the second device can utilize the new and unique access code to contact the first device after the first device verifies the new and unique access code.

* * * * *